United States Patent

Tang

[15] 3,647,964

[45] Mar. 7, 1972

[54] RUN-LENGTH-LIMITED CODING FOR MODIFIED RAISED-COSINE EQUALIZATION CHANNEL

[72] Inventor: Donald T. Tang, Yorktown Heights, N.Y.

[73] Assignee: International Business Machines Corporation, Armonk, N.Y.

[22] Filed: Feb. 24, 1970

[21] Appl. No.: 13,418

[52] U.S. Cl. .................................... 178/68, 325/38, 325/42, 340/347 DD

[51] Int. Cl. .................................... H04l 25/08

[58] Field of Search .................................... 178/66, 67, 68; 235/154; 325/38, 38 A, 41, 42; 340/347 DD

[56] References Cited

UNITED STATES PATENTS

| | | | |
|---|---|---|---|
| 3,522,539 | 8/1970 | Levine et al. | 178/66 X |
| 3,162,724 | 12/1964 | Ringelhaan | 178/68 |
| 2,700,696 | 1/1955 | Barker | 340/347 DD |
| 3,185,823 | 5/1965 | Ellersick, Jr. et al. | 235/154 |

*Primary Examiner*—Benedict V. Safourek

*Attorney*—Hanifin and Jancin and Charles P. Boberg

[57] ABSTRACT

To increase the rate at which data can be passed without intersymbol interference through an equalized low-pass channel of the raised-cosine-type each input digit sequence undergoes a preliminary encoding process that converts it into a corresponding run-length-limited sequence in which every "1" digit is separated from every other "1" digit in the sequence by at least one intervening "0" digit. The digits of such a run-length-limited sequence can pass through a modified raised-cosine channel without intersymbol interference at a rate that is twice the maximum rate at which this channel can reliably pass the digits of sequences containing 1's in immediately adjacent positions.

5 Claims, 12 Drawing Figures

INVENTOR
DONALD T. TANG

BY Charles P. Boberg

ATTORNEY $$H_c(f)=\frac{1/2\,(1+\cos 2\pi f T')}{(\sin 2\pi f T')2\pi f T'}$$

Patented March 7, 1972 3,647,964

RUN-LENGTH-LIMITED CODING FOR MODIFIED RAISED-COSINE EQUALIZATION CHANNEL

BACKGROUND OF THE INVENTION

This invention is concerned with the transmission of data at high speed (in terms of digits per second) through a limited-bandpass channel.

The rate at which a limited-bandpass channel can effectively transmit data is dependent upon (1) the type of signal coding employed, and (2) the minimum time separation that must be allowed between relatively abrupt changes of input signal level in order to avoid undue intersymbol interference within the channel. Assuming, for instance, that the channel is required to transmit binary digit sequences in which each "1" is represent by an impulse while each "0" is represented by the absence of any signal, then the data transmission rate is limited by the least time separation or spacing that can be permitted between 1's for interference-free transmission. If the digit sequences fed into the channel are of a type such that they may contain a plurality of 1's in immediately adjacent positions, then the transmission rate must be limited to accommodate this condition.

The frequency response characteristic of the channel determines how closely the changes of input signal level may be spaced for interference-free transmission. A low-pass channel having an ideal rectangular characteristic that terminates abruptly at a given cutoff frequency is most economical in theory, because it will permit the closest spacing between signal level changes for a given width of the channel pass band. In practice, however, it is not possible to design an equalizer which yields such an ideal overall channel characteristic exactly, and most channel equalizers are designed to give rolloff characteristics that slope with a skew symmetry in respect to a given frequency axis near the upper end of the pass band. Such a channel can transmit adjacent changes of signal level without undue interference at the same rate as an ideal low-pass channel with rectangular characteristic whose cutoff frequency is the axis of skew symmetry in the rolloff for the equalized channel. Thus, by moderately extending the range of frequencies which must be passed by the channel, as compared with an ideal channel, one can provide an economically feasible channel design for a given digit transmission rate.

There are known ways of shaping channel characteristics with desired rolloffs, and for a more complete treatment of channel design, reference may be had to textbooks such as, for example, *Data Transmission* by W. R. Bennett and J. R. Davey, Volume 2 of the Inter-University Electronics Series, published by the McGraw-Hill Book Company, 1965. One type of channel characteristic that is regarded with favor for several reasons is the "raised-cosine" frequency characteristic, the various advantages of which are set forth in Bennett and Davey's book, especially in Chapter 7–3 thereof. In addition to its known advantages, the raised-cosine frequency characteristic also has another feature not afforded by other channel characteristics. The time-base (or "time-domain") characteristic corresponding to a raised-cosine frequency characteristic has not only the usual null-axis crossover points afforded by all types of channel characteristics, which together with the initial apex position are commonly used as signal sampling points, but also some additional crossover points, each of which (on a time scale) is positioned midway between two of the conventional sampling points. These additional crossover points, in combination with the first-mentioned crossover points, provide a series of crossovers which are equally spaced in time, and there are about twice as many of these crossovers for a raised-cosine characteristic as there are for a characteristic of rectangular type. unfortunately, however, there is no additional crossover located midway between the apex position of this raised-cosine time-domain characteristic and the nearest of its conventional sampling points, so there is a nonuniform distribution of the crossover points relative to the initial apex position. Because of this fact, these additional crossover points have not been considered usable as sampling points. The occurrence of a "1" signal in the time interval between a preceding "1" signal and the first succeeding one of the conventional sampling points would produce intersymbol interference effects that could not be tolerated. Hence, although raised-cosine channels have been found useful for other reasons, they have not heretofore been fully utilized for the purpose of increasing the rate at which digital data can be transmitted.

SUMMARY OF THE INVENTION

An object of the invention is to increase the rate at which interference-free transmission of data may be accomplished in a limited bandpass channel. Specifically, it is an object to transmit data through a modified raised-cosine channel in a way such that all null-axis crossover points in the time-domain characteristic are available as signal points.

The modified raised-cosine channel which is contemplated herein has the property that, when the input of the channel is a unit square pulse of duration T, the output is the same as the impulse response of a regular raised-cosine channel, with T being the "Nyquist interval," or the interval between guaranteed nulls. When the input to a modified raised-cosine channel is a two-level signal, then a change of level at the input gives rise to an output which reaches its final level after an interval T and crosses the final level at every half interval, T/2, from that point on.

Each input sequence is first encoded into a corresponding run-length-limited sequence in which 1's do not occupy immediately adjacent positions. Each "1" in this encoded sequence will be represented as a change of level in the output of a signal generator, which supplies a two-level signal to the input of the modified raised-cosine channel. Since the run-length encoded sequence will contain no 1's in immediately adjacent positions, its digits may be transmitted and sampled twice as rapidly as would otherwise be possible in this type of channel. The fact that each level change in the channel input is separated by at least an absence of change from the next level change insures that there will be no intersymbol interference at this transmission rate. The channel output signal now may be sampled not only at the customary sampling points but also at the midpoints between these conventional sampling points. A "1" in the transmitted run-length-limited sequence can be detected from the fact that a change from one level to another has occurred. Furthermore, such a change takes two bit-times to complete, while passing through the midpoint after one bit-time. Simple correlated detection taking advantage of the above-mentioned property of the channel output signal will enhance the reliability of the detection process. The original input sequence can be obtained by passing the detected sequence through a decoder for the run-length limited sequence.

DETAILED DESCRIPTION

Figure 1:
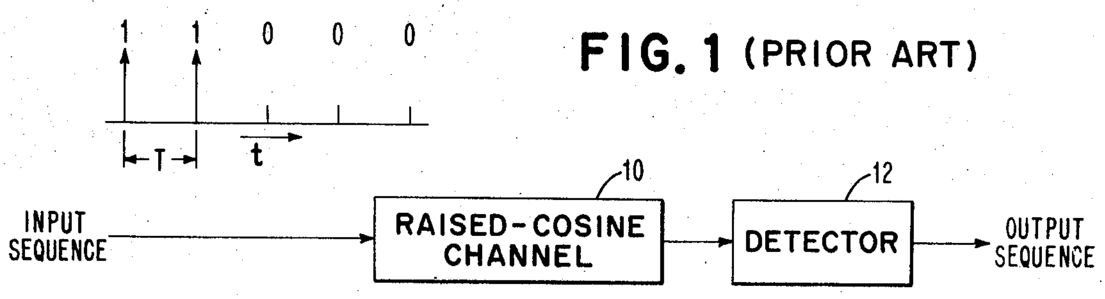
FIG. 1 (PRIOR ART)
FIG. 1 is a block diagram depicting the conventional manner of utilizing a raised-cosine channel in a data transfer system.

FIG. 1 represents the conventional manner of utilizing a raised-cosine channel 10 whereby the pulsed input digit sequence is fed directly into the channel 10. The output of channel 10 passes through a conventional detector 12 to provide the output digit sequence. "T" represents the pulse period, or the minimum time spacing of discrete digit pulses for interference-free passage of the signal through the channel 10.

Figure 2:
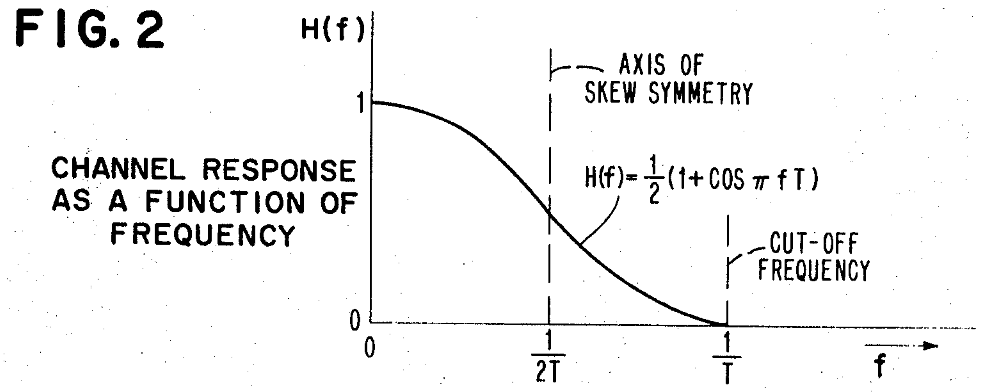
FIG. 2 is a graph of a frequency-response characteristic for a raised-cosine channel.

FIG. 2 depicts the frequency-response characteristic of a raised-cosine channel. This raised-cosine frequency characteristic may be achieved by the combination of an unequalized channel (e.g., coaxial cable) with a channel equalizer appropriately designed to produce an overall frequency response as shown in FIG. 2, the absolute value $H(f)$ of which is represented by the equation:

$H(f)=\frac{1}{2}(1+\cos \pi fT)$, wherein the values of the applied frequencies $f$ are less than or equal to $1/T$. For all other frequencies, $H(f)$ is zero. This frequency characteristic defines a low passband which has an upper limiting or cutoff frequency of $1/T$. Since a raised-cosine characteristic has 100 percent rolloff, its axis of skew symmetry is one-half the cutoff frequency, or $\frac{1}{2}T$ in this case.

The maximum frequency at which digits represented by impulses (assumed to be 1's in the present case) can be transmitted without intersymbol interference through an equalized channel is normally considered to be twice the skew symmetry frequency, this being otherwise known as the "Nyquist" frequency. In the case of a channel such as a raised-cosine channel whose characteristic has 100 percent rolloff, this Nyquist frequency is equal to the cutoff frequency of the channel. For an ideal low-pass channel with rectangular characteristic, it would be twice the cutoff frequency. For other types of equalized channels having some rolloff but not 100 percent rolloff in their characteristics, the Nyquist frequency falls somewhere between these two extremes. Hence, for a given cutoff frequency, the raised-cosine channel has a lower interference-free pulse transmission rate than any equalized channel with a sharper cutoff. However, because it offers other advantages, the raised-cosine channel is preferred in many instances. For example, such a channel is easier to design and has greater stability than other types of equalized channels.

It is generally assumed that the maximum digit transmission rate of a raised-cosine channel is equal to its maximum pulse transmission rate as defined above, i.e., the cutoff frequency of the channel. This assumption is based upon the premise that at least some of the digit sequences fed into the channel will contain at least two 1's in immediately adjacent time positions without any intervening 0 and this will limit the maximum digit transmission rate to the maximum pulse transmission rate. If, however, one could insure that the channel will receive only digit sequences in which each 1 is separated from every other 1 by at least one 0, then the digit transmission rate could be at least double the ordinary interference-free digit transmission rate through such a channel, and such run-length-limited sequences accordingly could be sampled at twice the rate of other sequences. To accomplish this result is one of the important objectives of this invention.

Figure 3:
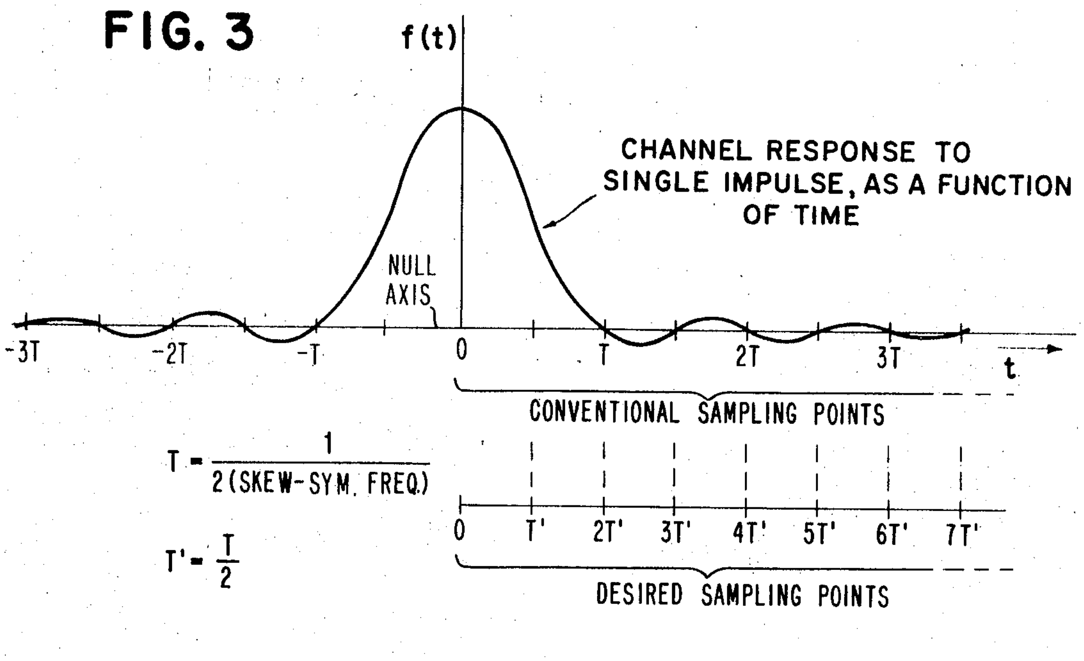
FIG. 3 is a corresponding time-domain characteristic showing the response of a raised-cosine channel to a single sharp impulse.

FIG. 3, which is a graph depicting the response of the raised-cosine channel to a single excitation pulse, as a function of time, shows why it would be feasible to sample a digit sequence passed through a raised-cosine channel at twice the ordinary rate if all 1's in the sequence were separated from each other by one or more 0's. Each impulse of excitation, applied at time 0 (the apex of the impulse), produces a voltage wave that crosses a null axis (zero-value axis in the present instance) at times $\pm T$, $\pm 1.5T$, $\pm 2T$, $\pm 2.5T$, $\pm 3T$, $\pm 3.5T$, etc., where "$T$" is defined as the reciprocal of twice the frequency about which the frequency-response characteristic of the channel is skew-symmetrical (FIG. 2). A succeeding impulse may be applied to the channel at any instant corresponding to one of these null-axis crossings without causing intersymbol interference within the channel; which is to say that this succeeding impulse may occur at any of the time intervals $T$, $1.5T$, $2T$, $2.5T$, etc., following the occurrence of the preceding impulse (but not in the interval between 0 and $T$) for interference-free transmission through the channel. By this same token, the voltage wave generated by each impulse may be sampled at intervals of $T/2$, provided that whatever transitional voltage value is detected at time 0.5T may be recognized as a 0, even though it actually may not have a voltage representative of 0. Hence, where conventional practice would require sampling the digital signal sent through a raised-cosine channel only at times $0, T, 2T$, etc., it is proposed herein to sample such a signal at times $0$, $T'$, $2T$, etc., where $T'=T/2$. To permit such doubling of the sampling rate, however, steps must be taken to insure that no impulse is applied to the channel during the time interval between the sampling points 0 and $2T'$ of a preceding impulse. This is the function of the run-length-limited encoder 14, FIG. 4, which precedes the raised-cosine channel 16 in a data transfer system built according to the invention.

Figure 4:
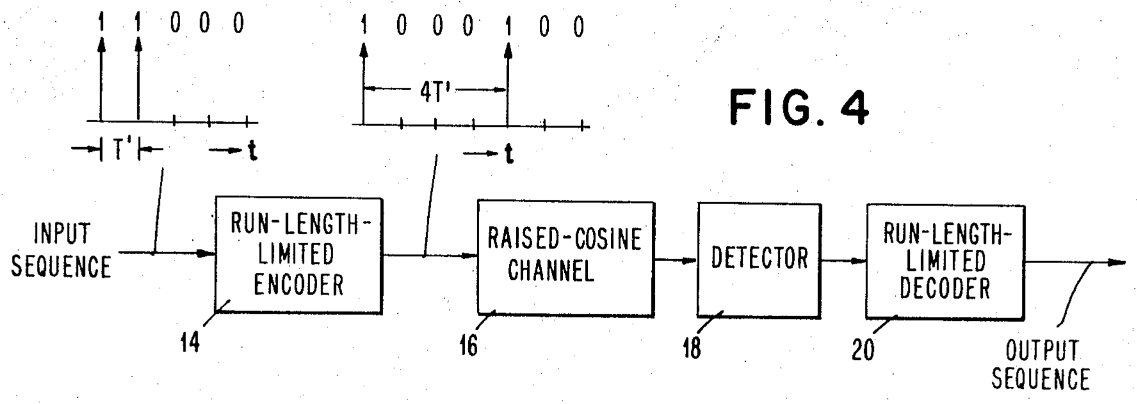
FIG. 4 is a block diagram generally representing the manner in which the invention is applied to a data transfer system utilizing a raised-cosine channel.

As indicated in FIG. 4, the encoder 14 will convert any input sequence containing 1's in immediately adjacent positions (i.e., separated by a time interval no greater than the sampling time $T'$, FIG. 3) into a corresponding sequence wherein the 1's are separated from each other by one or more 0's. As a specific example, it is assumed herein that an input sequence of binary digits 11000 will be converted by the encoder 14 into a sequence 1000100, wherein the 1's are now separated by three intervening 0's. Run-length-limited sequences also are known as "*dk*-limited" sequences, where "*d*" is the minimum number of 0's intervening between adjacent 1's and "*k*" is the maximum run-length of 0's in the sequence. The present invention is more particularly concerned with the "*d*" constraint (minimum number of intervening zeros), which is herein assumed to have a value of 1, and insofar as the present invention is concerned, "*k*" may have any valve, including infinity ($\infty$). A *dk*-limited sequence in which $k=\infty$ is often referred to as a "*d*-limited" sequence, since "k" has no significance under these conditions.

Where the invention is to be employed in a self-clocking system that relies upon the receipt of "1" signals every so often in order to keep the operation of the system properly timed, the "*k*" constraint must have a finite limiting value. In the well-known MFM coding system, for example, $k=3$ and $d=1$. Hence, a conventional MFM encoder could be employed as the encoder 14, FIG. 4, to insure that 1's in the encoded sequence are separated from each other by not less than one 0 and not more than three 0's.

The encoder 14, FIG. 4, also may be constructed as a special adaptation of the general-purpose *dk*-limited encoder which is described in IBM Research Report RC 1883, dated Aug. 1, 1967, "Run-length Limited Codes for Synchronization and Compaction," by D. T. Tang (IBM Watson Research Center, Yorktown Heights, New York 10598), or in the article entitled "Block Codes for a Class of Constrained Channels," by D. T. Tang and L. R. Bahl, Information and Control, Vol. 17, No. 5, Dec. 1970, pp. 436–461 (Academic Press, N.Y.). There will be described subsequently herein, with reference to FIG. 11, one form of this encoder in which $d=1$ and $k=\infty$. *It is further assumed herein, merely for illustrative purposes, that the original input sequences to the system are handled in sets of five digits each, and that each five-digit input sequence is converted into a seven-digit encoded sequence by the encoder 14. With the addition of one buffering digit between successive encoded sequences, this means that each set of five input digits results in the transmission of eight encoded digits through the channel 16. Since these eight digits are transmitted at twice the rate that digits ordinarily could be transmitted through such an equalized channel, however, the intelligence represented by these five input digits actually is transmitted through the channel in the same time that it would take to transmit only four input digits through an equalized channel of this kind in the conventional mode of operation. Greater economy of transmission time could be effected by increasing the number of digits in each input set, at the expense of increasing the cost of the encoder and decoder hardware. Furthermore, as will be apparent to those skilled in the art, still further saving of transmission time may be accomplished by judiciously selecting an optimal coding scheme to fit the particular conditions under which any given data transmission system operate.*

Figure 5:
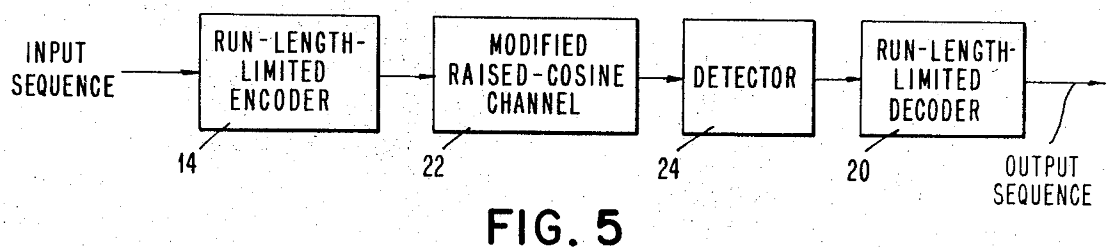
FIG. 5 shows a system similar to that in FIG. 4 except that a "modified" raised cosine channel is used. The modified channel uses a different signalling scheme and enables one to use a simple but more reliable detection method.

FIG. 5 shows a modified raised-cosine channel 22 in place of an ordinary raised-cosine channel 16 as in FIG. 4. This modification requires a slightly different equalized channel characteristic and uses a step signal generator which will be further explained in FIG. 6. The detector 24 correlates samples in the channel output signal and senses changes of levels which will be interpreted as 1's. This will be further explained in FIGS. 9 and 10. The modified system shown in FIG. 5 offers certain advantages over the preceding embodiment in respect to ease and reliability of detection, as will be explained hereinafter.

Figure 6:
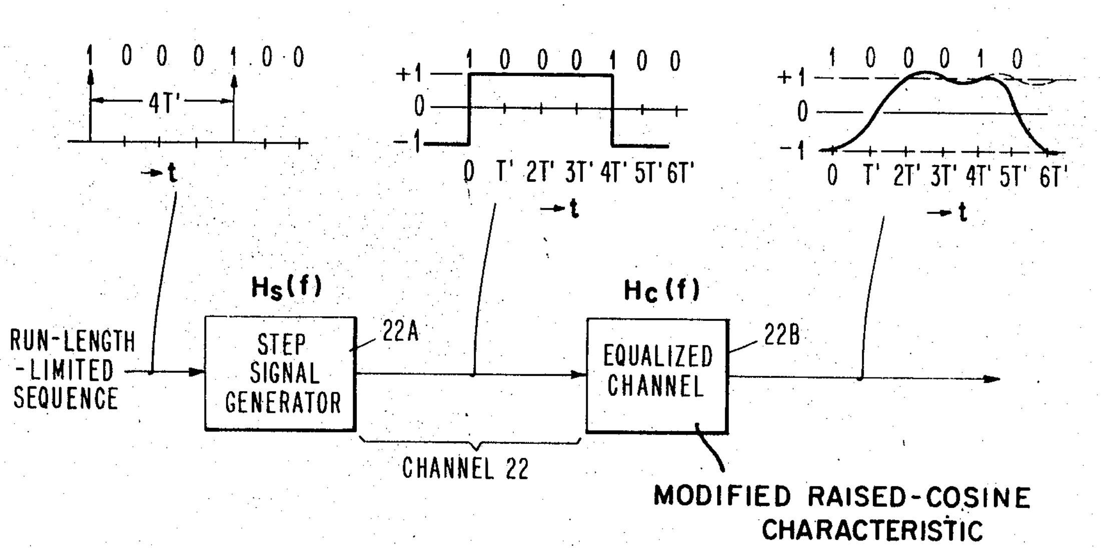
FIG. 6 is a more detailed showing of the modified raised-cosine channel utilized in the disclosed embodiment of the invention.
Figure 7:
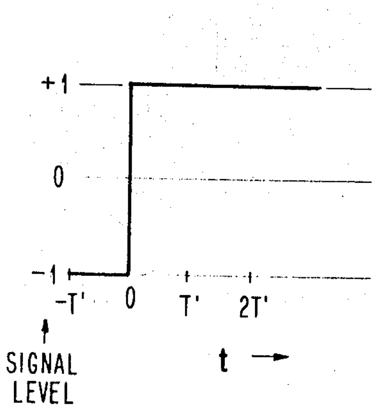
FIG. 7 is the output of the step signal generator shown in FIG. 6 corresponding to a "1" at its input at $T$=0.

Referring again to FIG. 5, the encoded sequence is passed through the channel 22 and then through a detector 24, which recognizes each significant change of signal level as a "1," following which it is decoded by the run-length-limited decoder 20, one form of which will be described hereinafter with reference to FIG. 12. To achieve high reliability in the detection of received digit sequences and to facilitate the elimination of errors caused by momentary disturbances in the channel 22, it is preferred to arrange the channel 22 in two parts 22A and 22B as shown in FIG. 6, part 22A being a step signal generator that feeds into an equalized channel portion 22B. In response to each input pulse representing a "1" in the encoded sequence, the generator 22A causes the voltage level within the channel 22B to change between its two null-axis levels, respectively designated +1 and −1, as shown in FIG. 7. Changes between these two levels are recognized as "1" digit representations, while lack of any change at either level is treated as a zero digit representation. In the art of magnetic recording, such a coding technique is known as "NRZI" coding. It is here employed for data transmission purposes. Thus, the output of generator 22A is a step signal having one polarity or the other at any given instant, with the transitions from one polarity to another representing digits of a certain binary value (i.e., 1) in the encoded sequence.

The frequency-response characteristic of the channel 22B is a modified raised-cosine function. The characteristic can be obtained from the requirement that a response identical to the impulse response of a raised-cosine channel is obtained when the input is a square wave of width $2T'$. To state this another way, if $H(f)$ is the frequency characteristic of a raised-cosine channel and $H_s(f)$ is the frequency characteristic of the square wave, then the modified raised cosine characteristic $H_c(f)$ is given by the following expression:

$H_c(f) = H(f)/H_s(f)$ Substituting the constant $2T'$ for T in the expression for H(f) as given in FIG. 2: $H(f)=\frac{1}{2}(1+\cos 2\pi fT')$ The Fourier transform or frequency-base equivalent of a function that appears in time domain as a rectangular wave is sin $x/x$, where $x$ in this case would be $2\pi fT'$. Hence, the frequency characteristic which the equalized channel 22B, FIG. 6, is required to have is given by the following expression (where all values are absolute):

$$H_c(f) = \frac{\frac{1}{2}\,(1+\cos 2\pi fT')}{(\sin 2\pi fT')/2\pi fT'},\ \text{for } f \leq \frac{1}{2T'}$$

Figure 8:
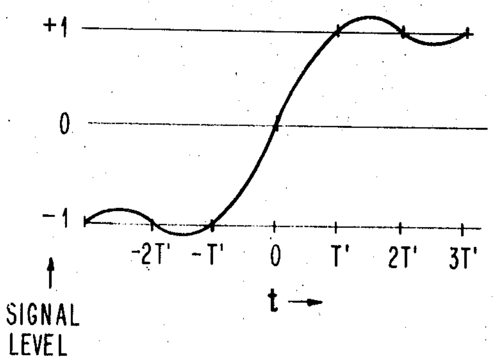
FIG. 8 is the response of the equalized channel shown in FIG. 6 to a step signal of the kind shown in FIG. 7.

The advantage of sending through the channel 22, FIG. 5 (or more specifically, through the channel portion 22B, FIG. 6) nothing but NRZI-type, run-length-limited sequences in which the 1's are separated from each other by one or more intervening 0's is that each change of signal level initiated by a "1" signal within the channel is allowed to complete itself before the next "1" signal occurs. Hence, for every genuine "1" signal, there will be a full transition of the voltage level within the channel from one level to the other level, as indicated in FIG. 8. The detector 24, FIG. 5, therefore is arranged to recognize only full transitions between the two "null" levels as 1's and to treat any other condition that may be detected at sampling time (whether it is a partial transition that does not develop into a full transition, or a normal null-level condition of the channel voltage) as a voltage state representing 0.

Figure 9:
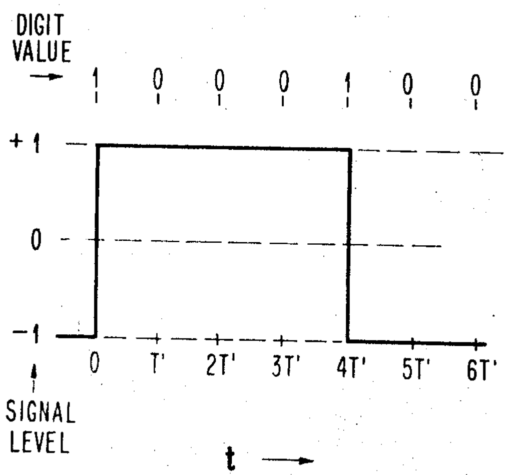
FIG. 9 is a typical signal waveform for the step signal generator shown in FIG. 6, showing its response to a given run-length-limited sequence.
Figure 10:
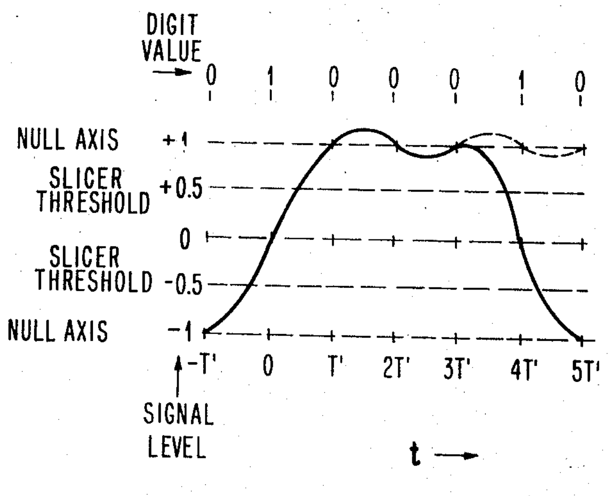
FIG. 10 is a typical output waveform for the equalized channel shown in FIG. 6, showing its response to a step signal of the kind shown in FIG. 9.

FIG. 10 depicts in time domain the response of the equalized channel 22B, FIG. 6, to a square wave consisting of two step signals shown in FIG. 9. The abrupt transition of the applied square wave voltage from the −1 level to the +1 level at time 0 produces a time variation in the channel output voltage as depicted in FIG. 10 between sampling times $-T'$ and $T'$; during which interval the channel output voltage varies from the −1 null level to the +1 null level (or vice versa) while passing through the midpoint 0 level at time 0. Except for time 0, this particular voltage wave tends to cross and recross one of the null axes (the upper one in this case for $t>0$, and the lower one for $t<0$) at multiples of $T'$. At sampling time $4T'$, in the particular example chosen herein, another transition of the voltage level from the +1 null level to the −1 null level is evidenced from the 0 signal level, such transition being completed at $5T'$. The two transitions which commenced respectively at sampling times $-T'$ and $3T'$ represent 1's in the run-length-limited sequence passing through the channel.

The recognition of a "1" in the sequence entails a comparison of the respective voltages that are detected at three adjacent sampling points. Each set of three adjacent sampled values is compared by the detector 24, FIG. 5, with a set of ascending values (−1, 0, +1) and another set of descending values (+1, 0, −1). The squared voltage differences existing at these sampling points can be summed to give the total coding "distances," which are passed through certain threshold gates that may be set up to reject steady responses or spurious partial transitions caused by noise or other disturbances and to recognize genuine transitions as 1's. In the event that these transitions may be slightly misplaced in time relative to the sampling instants, the detector can be arranged to make a logical decision as to the correct time position which the transition should have occupied. Slicer thresholds may be established as indicated in FIG. 10, for enabling all sampled responses to be broadly classified as belonging to the +1, 0 and −1 levels, respectively.

Figure 11:
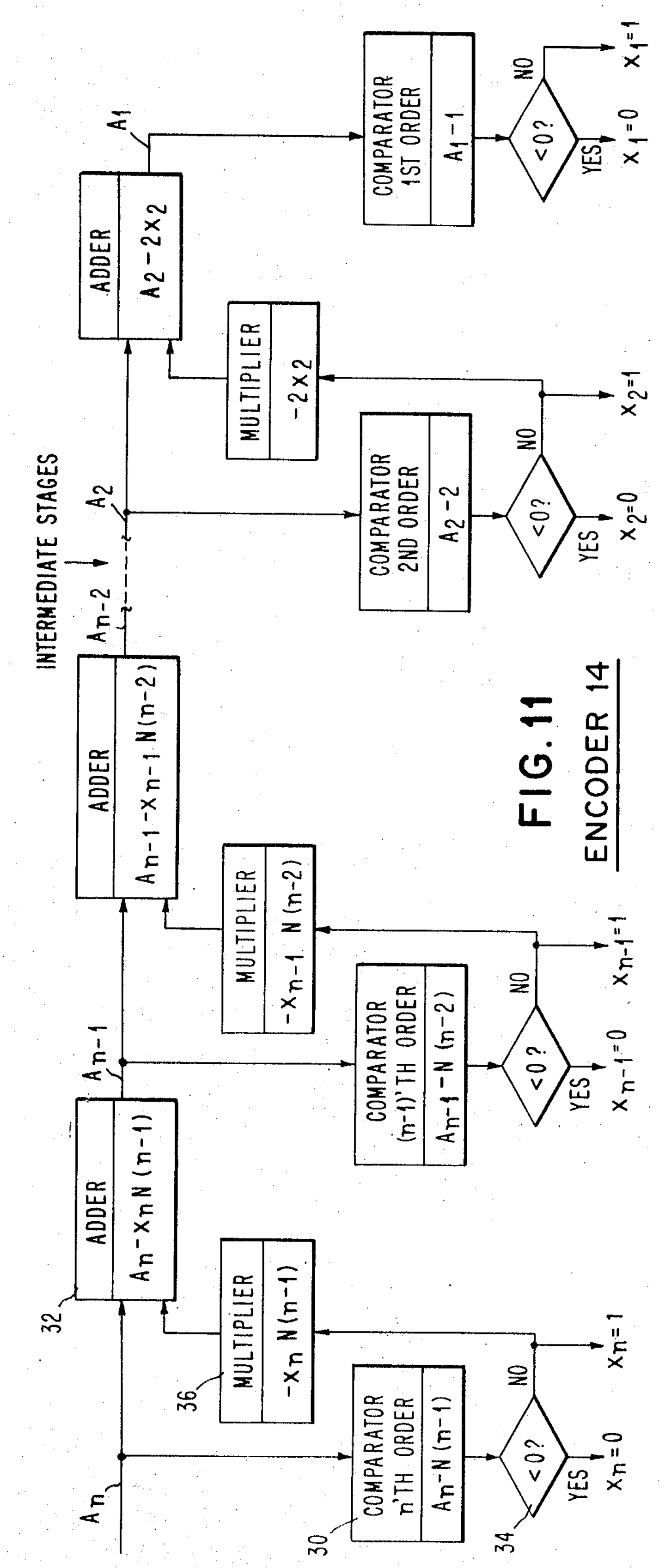
FIG. 11 is a block diagram representing the manner in which a general-purpose run-length-limited encoder may be adapted to produce the particular type of run-length-limited digit sequences that are utilized in the present illustrative embodiment of the invention.

A suggested functional design for the encoder 14, FIG. 4, is shown in FIG. 11. This is a special version of the general-purpose *dk*-limited encoder disclosed in the above-identified publications of D. T. Tang, wherein the "*k*" constraint is assumed to be infinite. In other words, the sequences generated by the encoder shown in FIG. 11 will have at least one 0 between every pair of 1's, but there will be no limit on the number of 0's that may occupy successive positions in the encoded sequence. If it is desired that *k* have a finite value, appropriate modifications can be made in the illustrated arrangement, as will be indicated hereinafter.

In the block diagram of FIG. 11, "$n$" represents the number of binary digits in the encoded sequence $x_n$, $X_{n-1}$, $x_2$, $x_1$. An expression such as "N($n$)" means the number of distinct *dk*-limited sequences having "$n$" digits each that may exist for the given values of $d$ and $k$. "$A_n$" the is an equivalent value (e.g., decimal value) which is fed into the encoder to be converted into a *dk*-limited binary sequence $x_n$, $x_{n-1}$, .....$x_2$, $x_1$. In the present instance, it will be assumed that $A_n$ is the equivalent decimal value of each five-digit binary input sequence, chosen by way of example herein. A binary input sequence of 11000, for instance, has an equivalent decimal value 24. A five-bit sequence may have a maximum value of 31 (all 1's). If $k$ is finite rather than infinite, $A_n$ may be the value of the input sequence plus some constant minimum value (designated "-MIN"), the magnitude of which depends in part upon the value of $k$.

In general, the number of distinct *dk*-limited sequences N($n$) having n digits each is determined by the following equation: 58 $N(n)+N(n-k-1)+N(n-2k-2)$ +..... = $N(n-1)+N(n-d-)+N(n-2d-3)$ + ..... +1

For any negative number $j$, N($j$)=0. If $n$=0, then the above equation reduces to N(0)=1. By taking these relationships as a starting point and assigning progressively higher values to $n$, one may build up a table of "$N$" values for any given values of $d$ and $k$, bearing in mind that any "$N$" term in the above equation may be disregarded if the parenthetical value associated with it is negative, and that N(0)=1. Thus, for $d$=1 and $k$=∞ (this latter condition specifying a "$d$-limited" sequence), the "$N(n$" values are as follows:

$N(1)$=2
$N(2)$=3
$N(3)$=5
$N(4)$=8
$N(5)$=13
$N(6)$=21
$N(7)$=34, etc.

Inasmuch as the maximum value $A_n$ for any five-bit input sequence is 31, making a total of 32 possible input values if 0 is included as a member of this set, only 32 distinct $d$-limited sequences are required in order to convert each of these possible input values to a distinct $d$-limited sequence in which $d$=1 (i.e., with at least one 0 intervening between each pair of 1's). Hence, referring to the above table, ample $d$-limited sequences will be available if $n$=7, since $N(7)$=34. Thus, any five-bit input sequence may be encoded into a distinct $d$-limited sequence (where $d$=1) by using no more than seven bits in the encoded sequence.

Referring again to FIG. 11, which shows a $d$-limited encoder for converting an input sequence of given length into a $d$-limited sequence of $n$ digits (where $n$ is appropriately selected to make the necessary number of distinct encoded sequences available for the given value of $d$), the input value $A_n$ is applied concurrently to an $n$'th-order threshold comparator 30 and to an adder 32. In the comparator 30, $A_n$ is compared with a threshold value $N(n-1)$, and a test is made by a decision unit 34 to determine whether or not $A_n$ is smaller than the threshold value $N(n-1)$. If it is, then the $n$'th order digit $x_n$ of the encoded sequence is 0; if not, then $x_n$=1. If $x_n$=1, then a multiplier unit 36 applies the value $N(n-1)$ subtractively to adder 32. Thus, if $x_n$=1, the value $A_n$ is reduced by N($n$−1) in the adder $A_n$ to yield a smaller output value $A_{n-1}$. If $x_n$=0, then $A_n$ and $A_{n-1}$ are identical.

A similar process is repeated for each of the $n$ orders of the encoder network 14. At each succeeding order, the comparator threshold is reduced. For instance, in the $n$−1'th order, the threshold is N($n$−2). For the second order, the threshold in N(1) or 2. For the first or lowest order, it is N(0) or 1. In each order, according to the result of its threshold comparison test, a 1 or 0 bit is generated as the "$x$" value in that order of the encoded sequence. The encoding operations may overlap. As soon as the $x_n$ bit has been generated for one input value $A_n$, the $n$'th order stage of the encoder is free to receive the next succeeding input value $A_n$ (allowing the necessary time interval for insertion of a buffering digit between sequences, if required).

For the case where $n$=7, the threshold values for the various orders are 21, 13, 8, 5, 3, 2 and 1, respectively, and the conversion of five-bit input codes to seven-bit output codes takes place in accordance with the following table:

| 5-bit Code | 7-bit Code |
|---|---|
| 00000 | 0000000 |
| 00001 | 0000001 |
| 00010 | 0000010 |
| 00011 | 0000100 |
| 00100 | 0000101 |
| 00101 | 0001000 |
| 00110 | 0001001 |
| 00111 | 0001010 |
| 01000 | 0010000 |
| 01001 | 0010001 |
| 01010 | 0010010 |
| 01011 | 0010100 |
| 01100 | 0010101 |
| 01101 | 0100000 |
| 01110 | 0100001 |
| 01111 | 0100010 |
| 10000 | 0100100 |
| 10001 | 0100101 |
| 10010 | 0101000 |
| 10011 | 0101001 |
| 10100 | 0101010 |
| 10101 | 1000000 |
| 10110 | 1000001 |
| 10111 | 1000010 |
| 11000 | 1000100 |
| 11001 | 1000101 |
| 11010 | 1001000 |
| 11011 | 1001001 |
| 11100 | 1001010 |
| 11101 | 1010000 |
| 11110 | 1010001 |
| 11111 | 1010010 |

While the above table lists all possible five-bit codes, it does not exhaust the possible seven-bit codes which fulfill the specified constraint, $d$=1.

If $k$ (the maximum run-length of zeros in the encoded sequence) has a value less than infinity, the comparison thresholds in the various orders of the encoder network will have to be adjusted accordingly, and the original input value will have to be modified by an added MIN value to yield the initial value $A_n$ that is to be encoded. For the $n$'th or highest order, the threshold would be:

$$\sum_{i=0}^{\infty} N[(n-1)-i(k+)]$$

For each succeeding order, the parenthetical value ($n$−1) in the above recursive expression is decreased by 1. The multiplier factors are the same as before. Thus, for instance, the multiplier factor for the $n$'th order would be $N(n-1)$, as indicated in FIG. 11 (unit 36).

With $k$ having a finite value, a new table of "$N(n)$" values would have to be built up, using the equation given hereinabove. A low value of $k$ may increase the number of digits needed in the *dk*-limited sequences to provide distinct encoded sequences satisfying the $d$ and $k$ constraints. Where $k$ is finite, the MIN value is given by the recursive expression:

$$\sum_{i=1}^{\infty} N[n-i(k+1)]$$

Figure 12:
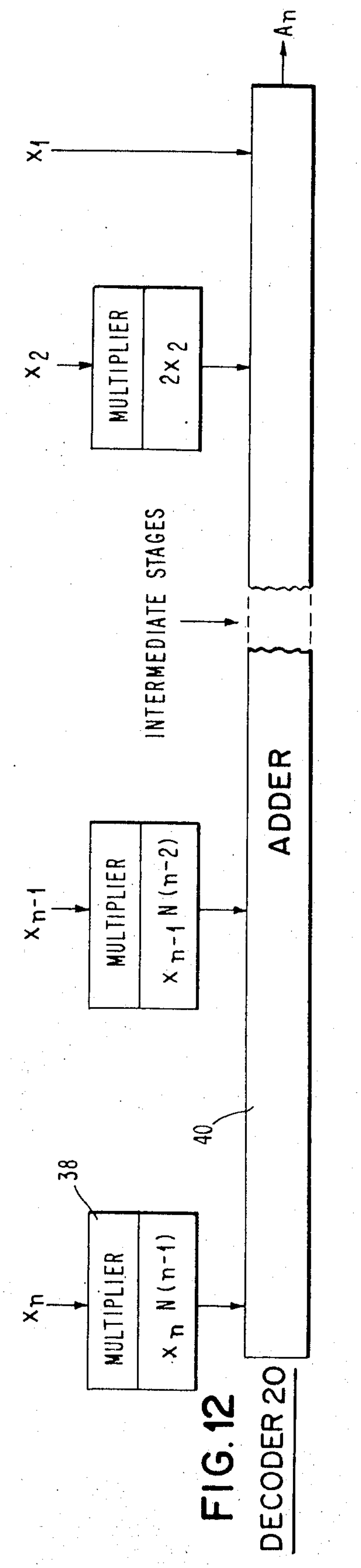
FIG. 12 is a generalized representation of the run-length-limited decoder for use in conjunction with the encoder shown in FIG. 11.

To decode the d-limited sequences generated by the encoder 14, the decoder 20, FIG. 12, is employed. This decoder will have the same form whether the run-length-limited sequences are *dk*-limited or only $d$-limited. The various "$x$"

digits of the encoded sequence are multiplied by the respective factors that were employed in the corresponding orders of the encoder, FIG. 11, changing the minus sign to a plus sign in each instance. For example, $x_n$ is multiplied by $N(n-1)$ in the multiplier unit 38. These various products are summed by an adder 40, FIG. 12, to yield the initial input value $A_n$ which was fed into the encoder.

To summarize, the invention doubles the rate at which binary digits can be transmitted through an equalized channel and sampled without intersymbol interference. By interspersing 1's and 0's as specified herein, using a *d*-limited or *dk*-limited encoder for that purpose, one can transmit these digits through a modified raised-cosine channel and sample them without interference at a rate four times the skew-symmetry frequency of the channel, whereas the conventional mode of data transmission through a raised-cosine channel (or any other type of equalized channel) permits binary data to be transmitted without interference at only twice the skew-symmetry frequency. Thus, the invention enables one to employ a raised-cosine channel (which has 100 percent rolloff in its characteristic and therefore conforms more nearly to the natural frequency characteristic of an unequalized channel) without paying the penalty of a lower digital transmission rate. Yet another advantage of substantial importance is the fact that the invention provides reliable interference-free and error-free transmission without resorting to the conventional expedient of correlative-level coding, which increases the number of legitimate voltage levels that the digital signals may occupy and requires the handling of higher-level digits. In the present scheme, an input two-level (binary) sequence may be transmitted as a two-level sequence. The NRZI-type encoding process which is used in conjunction with the run-length-limited encoding process insures that every 1 (and only a 1) in the transmitted binary sequence will cause a full transition of the signal from one null level to the other null level, so that true "1" signals may be distinguished from spurious "1" or "0" signals merely by the fact that they cause these complete signal-level transitions to occur, thereby simplifying the detection process and reliably eliminating errors caused by channel noise.

While the invention has been particularly shown and described with reference to several preferred embodiments thereof, it will be understood by those skilled in the art that various changes in form and detail may be made therein without departing from the spirit and scope of the invention.

What is claimed is:

1. A method of transferring binary digit sequences through a channel of the raised-cosine type comprising the steps of:

encoding each input binary digit sequence into a signal representing a run-length-limited sequence wherein digits of a given binary value are represented by changes from one to another of two predetermined voltage levels in said signal and are necessarily separated from each other by at least a predetermined minimum number of intervening digits of different binary value that do not cause such a voltage change;

passing the signal representing the digits of the encoded sequence through said channel;

and decoding the signal passed through said channel.

2. A data transfer method as set forth in claim 1 wherein the digits of the encoded sequence are caused to pass through said channel at a rate exceeding twice the skew-symmetry frequency of the channel.

3. A data transfer method as set forth in claim 1 which includes, as a step immediately preceding the passage of the run-length-encoded digits through said channel, a further encoding operation whereby each of the digits of said given binary value in the run-length-encoded sequence generates a change of voltage from one limiting level to the opposite limiting level in a set of three discrete voltage levels, while said intervening digits generate no such change of voltage, thereby causing the resultant channel voltage waveform to execute a complete transition from one extreme null level to another extreme null level in response to each input digit of said given value and to execute no such transition in response to the other digits;

said method further including the step of detecting complete voltage transitions between said null levels in the received channel signal as representing digits of said given value and all other states as representing digits of said other value.

4. A data transfer method as set forth in claim 3 wherein the digits of the encoded sequence are caused to pass through said channel at a rate substantially four times the skew-symmetry frequency of the channel.

5. Data transfer apparatus comprising:

a run-length-limited encoder for converting binary input digit sequences into signals representing run-length-limited sequences for passage through said channel, said encoder causing each digit of a given binary value to be represented by a change from one to another of two voltage levels and to be necessarily separated from every other digit of like value in the encoded sequence by at least one intervening digit of different value which causes no such voltage change;

a channel through which the run-length-limited sequence generated by said encoder is passed, said channel including the following portions:

a step signal generating portion responsive to the digits of said run-length-limited sequence for producing a three-level signal voltage wave in which the signal voltage changes from a limiting level of one polarity to a limiting level of the other polarity in response to each input digit of said given value but does not change polarity in response to digits of said different value;

and an equalized channel portion for passing the signal generated by said signal generating portion and having a frequency response characteristic $H_c(f)$ shaped according to the following equation, where $T'$ is the period between digits in the sequence:

$$H_c(f) = \frac{\frac{1}{2}\,(1+\cos 2\pi f T')}{(\sin 2\pi f T')/2\pi f T'}$$

means for detecting the presence of digits having said given value and said different value, respectively, in the signal passed by said channel according to the presence or absence of transitions from one limiting voltage level to the other limiting voltage level in said signal;

and means for decoding the detected signal.

* * * * *